March 6, 1951

D. HEYER 2,543,967

VARIABLE-SPEED DRIVE

Filed Dec. 17, 1943

Don Heyer,
INVENTOR.

BY

ATTORNEY.

March 6, 1951 D. HEYER 2,543,967
VARIABLE-SPEED DRIVE
Filed Dec. 17, 1943 4 Sheets-Sheet 2

DON HEYER, INVENTOR.

BY ATTORNEY.

March 6, 1951 D. HEYER 2,543,967
VARIABLE-SPEED DRIVE

Filed Dec. 17, 1943 4 Sheets-Sheet 3

Don Heyer,
INVENTOR.
BY
ATTORNEY.

March 6, 1951 D. HEYER 2,543,967
VARIABLE-SPEED DRIVE
Filed Dec. 17, 1943 4 Sheets-Sheet 4

DON HEYER, INVENTOR.
BY
ATTORNEY.

Patented Mar. 6, 1951

2,543,967

UNITED STATES PATENT OFFICE 2,543,967

VARIABLE-SPEED DRIVE

Don Heyer, Los Angeles, Calif.

Application December 17, 1943, Serial No. 514,638

16 Claims. (Cl. 74—230.17)

This invention relates to a variable ratio transmission wherein the ratio is a function of the center distance between a pair of belt connected pulley structures.

It is an object of this invention to provide improved supporting means for such a transmission.

It is another object of this invention to provide a novel arrangement for adjusting the center distance between the pulleys of such a transmission.

It is another object of this invention to provide such a transmission incorporating a prime mover and adapted to be mounted as a unit on the machine to be driven, either as a substitute for the prime mover such as a motor previously provided for the machine as in an individual motor drive, or in place of the belt provided to connect a belt driven machine with the usual countershaft.

For this purpose, the load driving shaft of the transmission is arranged to be connected with the driven pulley of the machine by a belt. It is accordingly, another object of this invention to provide a variable ratio transmission in which the positions of both the load driving shaft and the driving shaft or shaft of the prime mover are independently adjustable. Thus, the belt connecting the transmission with the machine may be appropriately tensioned, without interfering with the proper adjustment of the distance between the driving and load driving shafts for altering the transmission ratio.

It is another object of the invention to provide a transmission of this type so arranged that when the transmission is installed on the machine to be driven, the ratio adjusting means of the transmission is in a convenient place for manipulation by the operator of the machine.

It is another object of the invention to provide a transmission of this type having ratio adjusting means by which the ratio adjustment may be quickly approximated in large increments, the final adjustment being made in an accurate manner by small increments.

It is another object of this invention to provide a transmission of this type having ratio adjusting means which is automatically rendered inactive when the transmission is adjusted to either its minimum or its maximum ratio.

It is another object of this invention to provide a variable ratio transmission incorporating a centrifugally adjusted variable diameter pulley structure.

It is still another object of this invention to provide a variable ratio transmission arranged to automatically assume its low speed adjustment for starting the load or driven machine.

It is a still further object of this invention to provide a variable ratio transmission in which the ratio of the transmission is changed in response to the speed of the transmission, including means for controlling such rate of change.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 3 is a transverse section taken on line 3—3 of Figure 1;

Figures 2, 5:
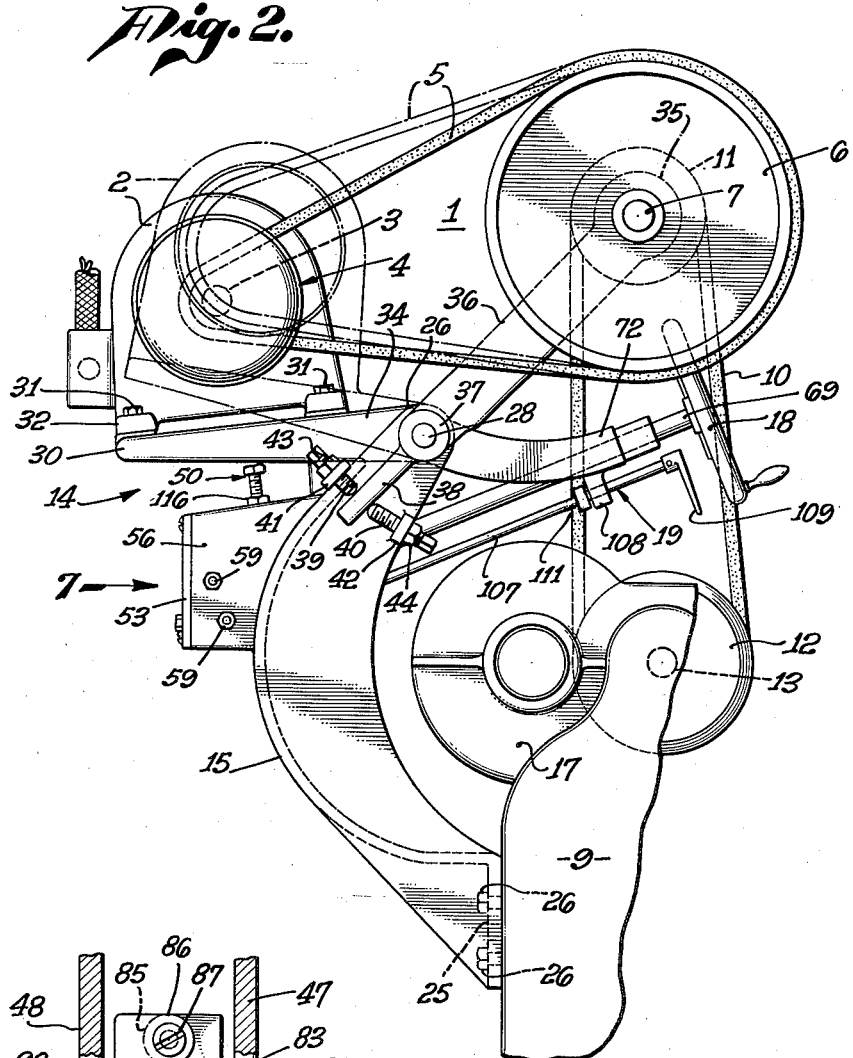
Figure 2 is an elevation of the transmission as installed for driving a machine.
Figure 5 is a fragmentary section taken on line 5—5 of Figure 4.

Referring to the drawings and particularly to Figures 2 and 3, the variable speed drive is indicated generally by the numeral 1 and includes a prime mover 2 such as an electric motor, on the driving shaft 3 of which is mounted an adjustable diameter pulley structure 4. The driving pulley 4 is operatively connected by a belt 5 with the load driving pulley 6 which is mounted on a countershaft or load driving shaft 7. The shaft 7 is arranged to drive the load in any suitable manner. In this case the load is shown by way of example as a machine tool, a fragment thereof being indicated at 9 and is shown as being adapted to be driven by a belt 10 passing over the pulleys 11 and 12 respectively, on the load driving shaft 7 and the main shaft 13 of the machine 9. The elements of the variable speed drive 1 are supported on a frame structure 14 which includes a mounting bracket 15, secured to the frame of the machine 9. In the present case the machine tool 9 is shown as including back gearing 17, bracket 15 being appropriately shaped to clear this back gearing 17, and to locate countershaft 7 in a position adjacent the shaft 13 of the machine 9.

The driving pulley 4 is of that type having a pair of relatively axially adjustable pulley sections with opposed oppositely inclined faces adapted to engage respectively the opposite edges of a V-belt, relative axial adjustment of the pulley sections serving to alter the radial position of the belt on the pulley face and hence to alter the effective diameter of the pulley. Furthermore, centrifugal means are provided whereby rotation of the pulley causes a force to be exerted urging the pulley to assume an increased diameter, the amount of such force depending on the speed of rotation.

Since the load driving pulley 6 has a fixed diameter, the frame 14 includes means for varying the center distance between the shafts 3 and 7, in accordance with variations in the diameter of the pulley 4, means being provided to maintain the belt under proper tension at all times. Thus, as the pulley 4 slows down the centrifugal force urging the pulley sections together decreases and the belt tension urges the pulley sections apart to reduce the effective pulley diameter; conversely as the speed of the pulley 4 increases, the centrifugal force overcomes the force of the belt tension urging the pulley sections apart and causes the pulley sections to move relatively closer together to increase the effective pulley diameter.

Such an arrangement has important advantages. Thus, the transmission always returns to the low ratio as the mechanism is brought to a stop, so that it is in the most effective adjustment for starting the load. Then as the torque requirements decrease, and the mechanism speeds up, the transmission automatically assumes a higher ratio. Means are provided for determining the high speed ratio which the transmission will assume during operation, such means being readily adjustable in an accurate manner by mechanism operated by a hand wheel 18, supplementary quick acting mechanism 19 operated by a hand grip for obtaining a rough adjustment being provided. An important feature of the invention is that it permits hand wheel 18 and hand grip 19, which determine the operating or high speed ratio of the transmission, to be located in a position where they may be conveniently reached by the operator of the machine 9.

Referring in more detail to the structure of the frame 14, the bracket 15 has a base 24, serving to secure the bracket to the machine 9 as by bolts 25. The bracket 15 has a pair of upwardly extending spaced apertured arms 26 and 27 through which a shaft or pin 28 passes, being fixed therein as by set screws 29 to form a fixed pivotal support. The motor 2 is appropriately secured on a base or supporting member 30 as by bolts 31 passing through lugs 32 on the frame of the motor 2. The base 30 is supported on the pin 28 for free angular movement about the axis thereof by arms 33 and 34 formed integrally with the base 30. The base 30 with the motor 2 thereon is urged to move in a counterclockwise direction about the pin 28 by the weight of the motor 2, etc., such movement being restricted by the belt 5. The load driving shaft 7 is shown as supported by suitable anti-friction bearings mounted in a pair of axially spaced cages 35 formed on one end of a bracket member 36, the other end of the bracket 36 being provided with ears or lugs 37 through which the pin 28 passes. The bracket 36 is angularly adjustable about the pin 28 to vary the distance between the shaft 7 and the main shaft 13, whereby the tension in the belt 10 may be adjusted. As a means of maintaining the bracket 36 in adjusted position, one of the ears 37 is provided with a radial extension 38 confined between adjustable stops 39 and 40 on the bracket arm 16. The stops 39 and 40 are respectively threaded through the lugs 41 and 42 on the bracket 15, being held in adjusted position by check nuts 43 and 44. By advancing one stop 39 or 40 with respect to its supporting lug and retracting the other stop, the extension 38 and hence the bracket 36 may be swung about the pin 28. By advancing both stops, the extension 38 is clamped between them.

Figure 8:
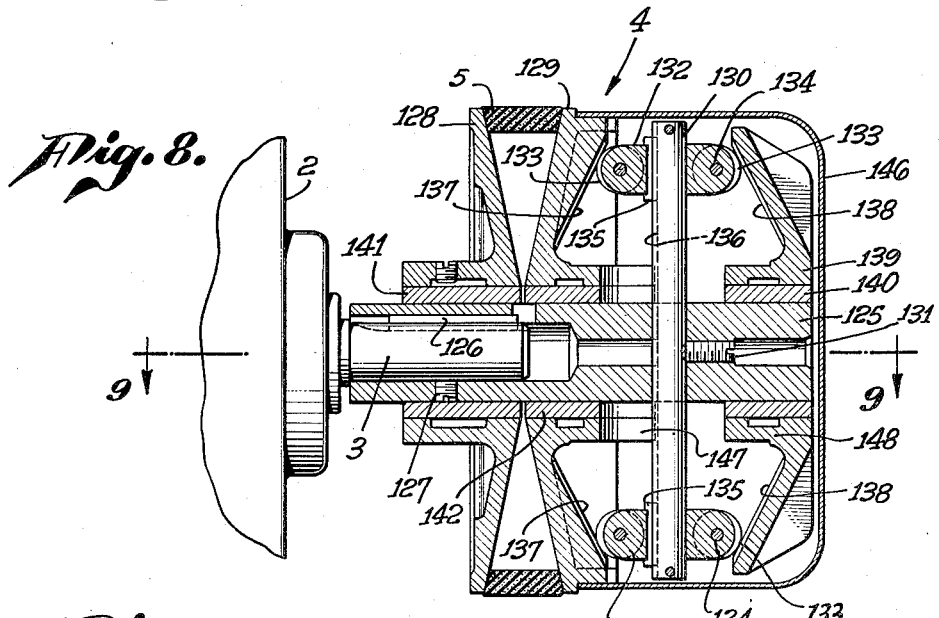
Figure 8 is a cross section of the driving pulley on an enlarged scale taken on line 8—8 of Figure 3, but showing the pulley structure adjusted to a different effective diameter; and, Figure 9 is a fragmentary cross section taken on line 9—9 of Figure 8.
Figure 9:
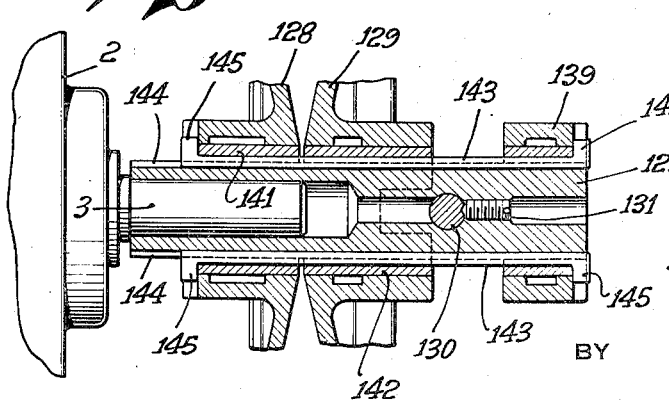

The driving pulley 4 will now be described briefly, reference for this purpose being had to Figures 8 and 9. These figures illustrate the pulley at its maximum effective diameter giving the transmission its high speed ratio such as would exist with the motor 2 in the broken line position of Figure 2. Such a pulley structure is described and claimed in a copending application filed in the name of Don Heyer on December 14, 1942, entitled "Variable Speed Drives," and bearing Serial No. 468,891, now Patent No. 2,395,625, issued February 26, 1946.

A short shaft 125 is fixed to the motor shaft 3 by means of a key 126 and a set screw 127, forming in effect an extension of the motor shaft. Slidably mounted on this shaft 125 is a pair of pulley sections 128 and 129 having oppositely inclined confronting belt engaging surfaces. When these pulley sections move away from each other the belt 5 moves inwardly toward the axis of the pulley and the effective diameter of the pulley 4 is decreased. The arrangement is such that the pulley sections 128 and 129 move by equal increments in opposite directions, thus no lateral movement is imparted to the belt 5 as the effective pulley diameter is altered. The load driving pulley 6 may be an ordinary flat faced pulley engaging the inner surface of the belt 5. By using such a pulley the need of accurate alignment between the pulleys 4 and 6, as would be the case if they were both V-grooved pulleys, is avoided.

An elongated pin 130 extends diametrically through the shaft 125 and is secured therein by a set screw 131. Slideably mounted on the pin 130 is a pair of weights 132, which comprise the centrifugal device. Each weight 132 has a pair of small rollers 133, rotatably mounted on opposite sides thereof by means of pins 134, passing through the respective weights and carrying the rollers on their opposite ends. Each weight 132 has a key 135 secured thereto, which engages the slot 136 formed in the pin 130 and restricts rotation of the weight about the rod. It is obvious that centrifugal force acting on weights 132 in response to rotation of the shaft 125 will urge the weights outwardly along the pin 130 with respect to the shaft.

Pulley section 129 has a pair of opposite inclined diametrically opposite, inclined cam surfaces 137 against which one set of rollers 133 on weights 132 respectively bear. A pair of correspondingly inclined cam surfaces 138 facing respectively surfaces 137 and inclined in the opposite direction, are formed on a member 139. Member 139 is secured to a bushing 140, which is axially slideable on the shaft 125.

Pulley sections 128 and 129 are similarly secured to bushings 141 and 142 which are also axially slideable on the shaft 125. To prevent rotation of the pulley sections and member 139 with respect to the shaft 125, a pair of long keys 143 are provided (Figure 9). These keys 143 engage suitable keyways in bushings 140, 141 and 142 and are slideably mounted on slots 144 in the shaft 125. Each of the keys 143 has heads 145 formed on its opposite ends which engage respectively the outer sides of the member 139 and of the pulley section 128. Thus, as the member 139 moves to the right in response to outward movement of the weights 132 the pulley section 128 also moves to the right. Outward movement of the weights 132 also causes a movement of the pulley section 129 to the left, and since the cam surfaces 137 and 138 are at equal angles to and oppositely inclined with respect to the axis of the pin 130 and this is perpendicular to the axis of the shaft 125, the movement of the member 129 is equal in amount to the movement of the member 128. A protective cover 146 can be placed over the entire centrifugal device and its associated parts if desired. As the pulley sections 128 and 129 are urged together, the belt 5 is urged radially outwardly between them which increases the belt tension. When this tension becomes sufficiently great to overcome the force fixing the distance between the shafts 3 and 7, the distance between the shafts is decreased, allowing the belt to move further outward to a position of increased effective diameter, as shown in Figure 8.

In the present construction, the weight of the motor 2 and the motor base 30 acting about the pin 28 as a pivot creates the belt tension which must be overcome to permit an increase in the effective diameter of the pulley 4. Means to be presently described are provided for limiting the decrease in the center distance of the shafts 3 and 7, thus determining the maximum speed ratio which the transmission may assume. Also means are provided for adjusting the tension in the belt 5 caused by the weight of the motor 2, etc.

Furthermore, as the centrifugal force decreases due to a reduction in the speed of the shaft 3, the belt tension is effective to cause the belt 5 to force the pulley sections 128 and 129 apart and thus form a decreased effective diameter, at the same time the belt tensioning means causes an increase in the center distance between the shafts 3 and 7. Thus, the pulley automatically returns to its minimum effective diameter as the transmission comes to a standstill, thereby assuring a minimum transmission ratio and maximum torque for starting the load.

When the motor 2 is operating under normal load conditions, the pulley 4, as just explained, tends to assume a greater effective diameter urging the shaft 3 toward the shaft 7. To control the ratio of the transmission, mechanism is provided to limit such movement of the shaft 3, and thus restrict the maximum effective diameter which the pulley 4 can attain. Further, since it is an important feature of the invention to provide a transmission which automatically returns to low ratio high torque position for starting, this mechanism serves to limit the extent of movement of the shaft 3 toward the shaft 7, and cannot act to prevent movement of the shaft 3 away from the shaft 7. Thus, an additional advantage of being able to set the maximum speed ratio which the transmission will assume upon operation, at any time, either while the transmission is operating at any ratio or stationary, is provided. Hence, before starting the machine, the maximum speed it will attain may be preset.

Figure 1:
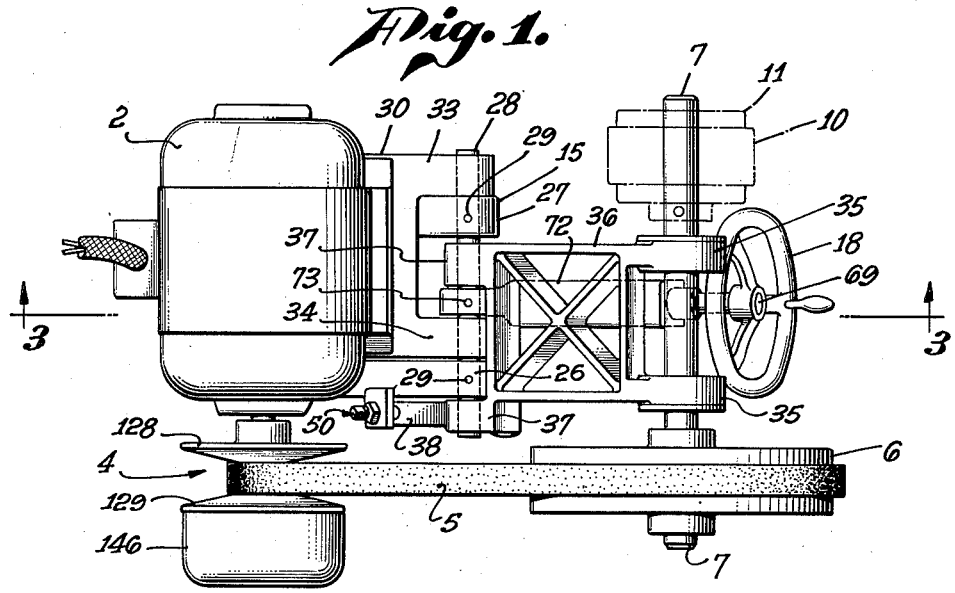
Figure 1 is a plan view of a transmission incorporating the invention.
Figure 4:
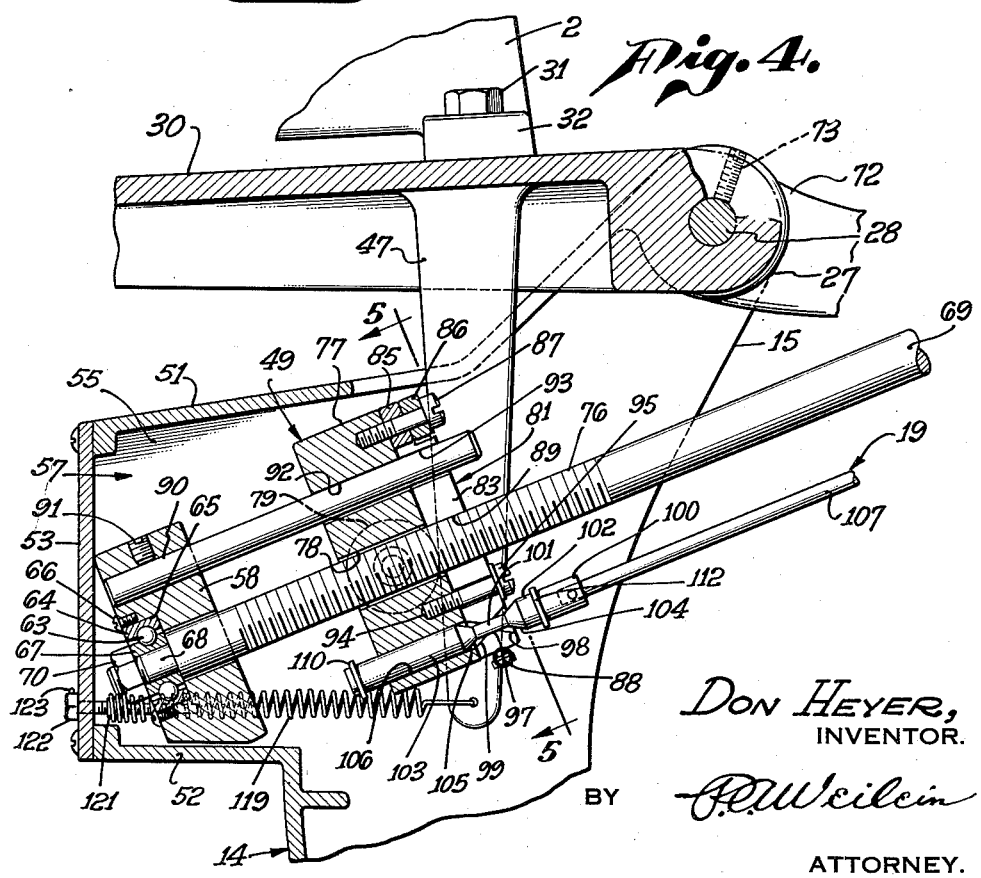
Figure 4 is a detail transverse section on an enlarged scale showing the ratio controlling mechanism.

For this purpose a pair of depending arms 47, 48 are provided in the motor base 30 (see Figures 3, 4 and 5) and an adjustable abutment 49 is provided which is adapted to engage the arms 47 and 48 and limit clockwise movement of the base 30 about the pin 28.

Figure 7:
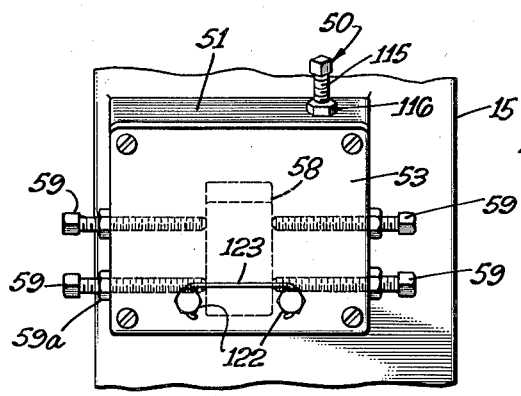
Figure 7 is an elevation of a fragment of the transmission frame as seen from the left of Figure 4.

The bracket 15 includes a pair of spaced horizontally extending walls 51 and 52, joined by a vertically extending detachable cover plate 53, and cooperating with vertical walls 55 and 56 to form a housing or case 57, serving to enclose and protect the abutment 49 and associated mechanism. A thrust block 58 is adjustably secured in the housing 57 as by being clamped between screws 59 threaded through the side walls 55 and 56 of the housing 57. Lock nuts 59a are provided to hold the screws 59 in adjusted position (see Figure 7). An anti-friction radial and thrust bearing 63 is mounted in the block 58 as by having its outer race 64 secured in a recess 65 in the block as by screws 66. The inner race 67 of the bearing 63 is secured on a reduced portion 68 of a threaded control shaft 69 as by a nut 70. Thus, the bearing 63 serves to radially support the adjacent or inner end of the rod 69 as well as to hold the shaft 69 against axial movement in either direction. The outer end of the shaft 69 is guided as by being rotatably supported in a suitable bore 71 in a control bracket 72. Control bracket 72 is supported on the pin 28 being secured thereon in adjusted angular as well as axial position by a set screw 73 (see Figure 4). Hand wheel 18 is secured on the outer end portion of the shaft 69.

Control shaft or adjusting rod 69 is provided with a threaded portion 76, whereby rotation of the shaft 69 serves to move the abutment 49 axially along the shaft. Abutment 49 comprises a generally rectangular block 77 with a clearance aperture 78 for the rod 69 and has rollers 79 and 80 pivotally mounted on its opposite sides for engagement respectively with the arms 47 and 48. A split nut 81 is provided for operatively connecting the block 77 to the rod 69 to be moved in response to rotation thereof. The nut 81 is formed of a pair of substantially similar half nuts 83 and 84 having respectively ears 85 and 86 serving to pivotally secure the half nuts on the block 77 as by a screw 87 threaded into the block. As shown in Figure 5, the half nuts are adapted to be urged together as by a tension spring 88 to form an aperture 89 embracing the rod 69 and internally threaded so that the nut 81 operatively engages the threaded portion 76 of the rod 69. The abutment means 49 is guided for axial movement on the rod 69 by a guide bar 90 secured in the block 56 as by a set screw 91, and passing through suitable openings 92 and 93 in the block 77 and the nut 81 respectively. To assist in transferring the thrust from the nut 81 to the block 77, an additional screw 94 having a large head 95, is provided in the block 77, the head 95 engaging the face of each of the half nuts 83 and 84. Thus, rotation of the rod 69 serves to adjust the abutment 49 axially of the rod 69, which in turn, by engagement of the arms 47 and 48 with the rollers 79 and 80, alters the position which the base member 30 may assume about the pin 28 in response to the belt tension. This fixes the distance to which the driving shaft 3 may approach load driving shaft 7 in response to the tendency of the pulley 4 to assume an increased diameter and thus determines the effective diameter which the pulley 4 may assume, thereby determining the speed ratio of the transmission.

Should it be desired to roughly adjust the position of the member 49 to alter the center distance and speed ratio without the need of much accuracy, means are provided for swinging the half nuts 83 and 84 apart about the pivot screw 87 so that the aperture 89 is free of the threaded portion 76 of the rod 69 (see Figure 6) whereby application of force parallel with the axis of the rod 69 serves to move the member 49 axially of the rod. When the member 49 has thus been adjusted to approximately the desired position, the nut 81 may be allowed to reengage the rod 69, and the member 49 accurately adjusted by rotation of the rod 69.

Means are provided whereby the force which urges the nut 81 out of engagement with the rod 69 also serves to move the member 49. Thus, the nut 81 is provided with a through opening 97, the opposite end portions of which are tapered to form cam surfaces as at 98 and 99. As clearly shown in Figures 5 and 6, this opening 97, the aperture for screw 94, threaded aperture 89, aperture 93 and supporting screw 87 all have axes lying in a common plane, which plane coincides with the surface of contact between half nuts 83 and 84. Thus, each of these apertures or openings is equally divided between the half nuts.

Figure 6:
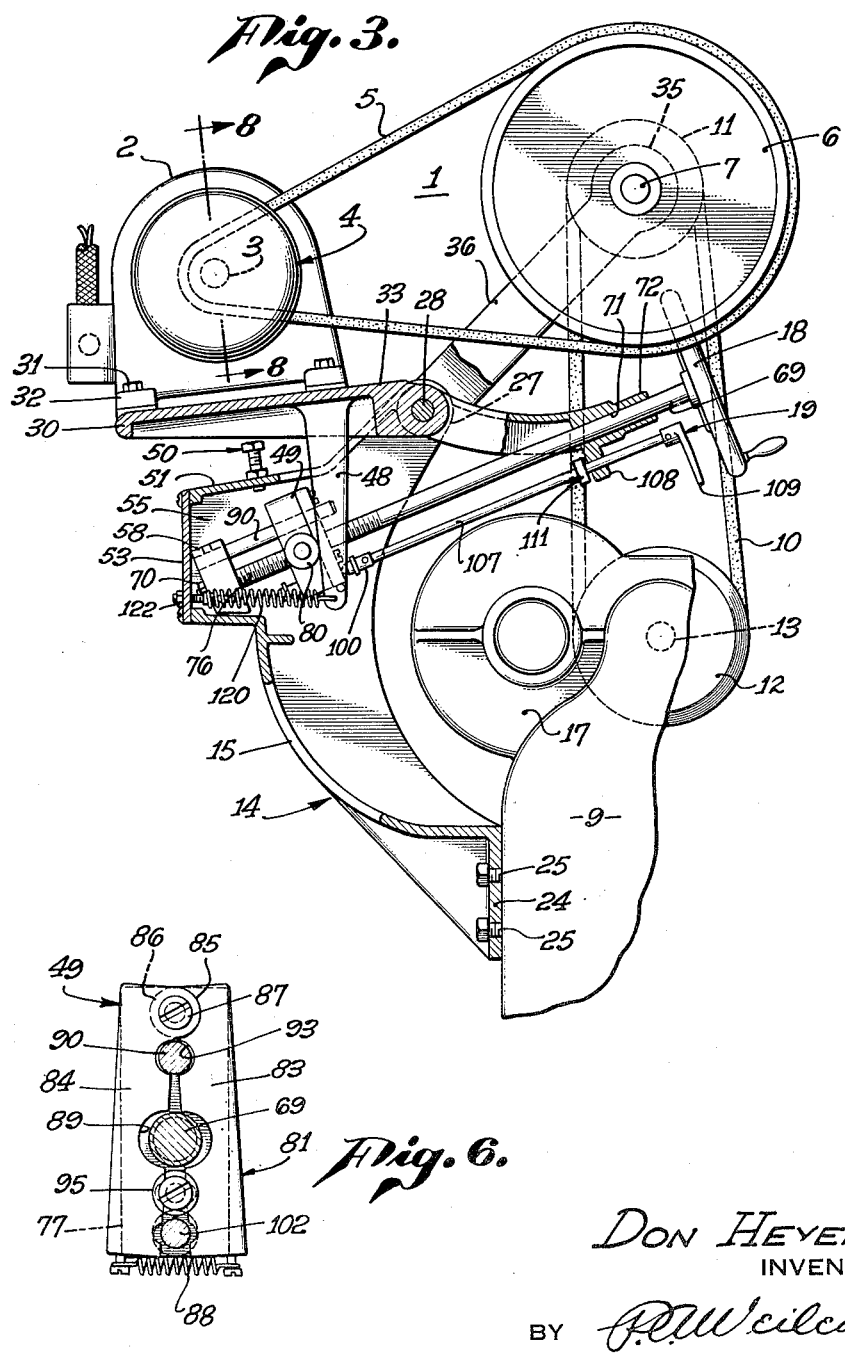
Figure 6 is a view similar to Figure 5 but showing an alternative operative position of the parts.

The operating means 19 for the quick change mechanism comprises a rod member 100 having a reduced intermediate portion 101 passing through aperture 97 and joined to the larger end portions 102 and 103 by oppositely directed spaced tapered or cam surfaces 104 and 105. End portion 103 is slideably supported on a bore 106 in the block 77 while the other end portion 102 has an extension rod 107 secured thereto and extending to near the hand wheel 18 where it is guided in a lug 108 formed on the bracket 72. A hand grip 109 is secured on the outer end of the rod 107. A shoulder 110 and 112 is formed adjacent each end of the member 100 as by a spring snap ring engaging a suitable groove in the member 100. The arrangement is such that upon axial movement of the extension rod 107 and the rod member 100 in an outward direction (toward the right in Figure 4) the cam surface 105 engages the cam surface 99 urging the half nuts 83 and 84 apart as shown in Figure 6, freeing the nut 81 from the rod 69. Continuation of such movement brings the shoulder 110 on the rod end portion 103 against the block 77, so that the block 77 moves with the member 100 as desired, or until the movement is stopped by engagement of the stop 111 on the rod extension 107 with the lug 108. When the block 77 has been moved a desired amount, reverse movement of the rod for a short distance serves to move the cam surface 105 out of engagement with the cam surface 99 allowing the half nuts 83 and 84 to move together in response to the spring 88 and reengage the threads on the rod 69, so that the block may be moved by rotation of the rod 69.

Similarly when it is desired to move the block 77 inwardly or to the left (Figure 4), the member 100 and the rod 107 are moved to the left causing engagement between the cam surfaces 104 and 98. This spreads the half nuts 83 and 84 out of engagement with the rod 69 and brings the shoulder 112 on the end portion 102 into engagement with the face of the half nuts 83, 84. Such movement may be continued until the end of the portion 103 strikes the thrust block 58.

An important feature of this ratio adjusting mechanism is that the threaded shaft 69 is automatically rendered inactive upon the adjustment of the transmission to either its maximum or minimum ratio. It has just been explained how movement of the abutment 49 by the quick adjusting means 19 is directly stopped at the minimum ratio setting by engagement of the collar 111 on the rod 107 with the lug 108, and similarly this movement is stopped at the maximum ratio setting by engagement of the end 103 with the thrust block 58. When the abutment 49 is being adjusted by the shaft 69, the half nuts 83 and 84 are of course engaged with the threads 76 due to the spring 88. As the abutment 49 is adjusted toward its low ratio position, the rod 100—107 is moved along with it due to engagement of the cam surfaces 98 and 104. However, since no force is exerted on the rod 100—107, there is no tendency to spread the nut halves 83 and 84. However, upon engagement of the collar 111 with the lug 108, movement of the rod 100—107 is checked, so that continued movement of abutment 49 causes the cam surfaces 98 and 104 to cooperate and spread the half nuts 83 and 84 to free the rod 69. This further movement of the abutment 49 in response to rotation of the rod 69 is stopped. Similarly, as the abutment 49 approaches its position of maximum ratio in response to movement in the opposite direction, the end portion 103 of the rod 100—107 engages the block 58 so that continued movement of the block 49 causes the conical surface 99 to be forced over the tapered section 105, urging the half nuts 83 and 84 apart and out of engagement with the shaft 69, so that continued rotation of the rod 69 will not affect the abutment 49. Obviously, after such disengagement of the split nut 81 from the threaded control shaft 69 at either the maximum or minimum limit, it will be necessary to move abutment 49 a short distance toward the other limit by the quick acting means 19, to permit the half nuts 83 and 84 to again engage the shaft or rod 69.

An important advantage of this ratio setting mechanism is the facility with which it may be assembled. Thus, the thrust block 58 together with the bearing 63 and guide bar 90 is mounted on the end of the rod 69, and abutment 49 is mounted on the rod 69 and the guide 90, the half nuts 83—84 being separated to clear the rod 69 to facilitate this. The rod member 100 is then inserted in the block 77 and snap rings 110 and 112 placed on the rod. When the motor base 30 is in its lowest position, the rod 69 together with the assembled parts thereon is inserted into the housing 57 from the left, until these assembled parts are inside the housing 57 and the shaft 69 is inserted in the bore 71 in the bracket 72 and the rod extension 107 is passed through the lug 108, the collar 111 having been placed on the rod 107 previously. At this time, the bracket 72 is free on the pin 28 so that it may swing downwardly to receive the shaft 69 and rod 107. After the insertion of the rod 107 and the shaft 69, the bracket 72 is swung upwardly to the proper position on the pin 28 as shown in Figures 2 and 3 and secured by set screw 73, and screws 59 are advanced inwardly to engage the block 58 on opposite sides and clamp it in position (see Figure 7). It will be apparent that the block 58, before being clamped, is free to assume any position in conformity with the position of the shaft 69. Hence the necessity for accurate machining of the parts to permit alignment thereof is obviated. Hand wheel 18 and the hand grip 109 may be secured respectively on the rod 69 and the rod 107 at any time after assembly.

For adjusting the tension of the belt 5 as well as for controlling the rate at which the transmission ratio changes, means are provided for altering the effective weight of the motor 2 and the base 30 with respect to the pin 28. Thus, a pair of coil springs 119 and 120 are tensioned respectively between the ends of the arms 47 and 48 and the cover 53 of the housing 57, acting as a counterbalance and tending to swing the motor 2 and the base 30 upwardly. As a means of altering the force exerted by these springs 119, 120, each spring is formed about a nut as 121, Figure 4, which nut is engaged by a headed screw member 122 passing through the cover 53. The tension in the spring 119 urges the head of the screw 122 against the outside of the cover 53. By rotating the screw 122, the nut 121 may be moved with respect to the cover 53, thus altering the tension in the spring. Appropriate lock means 123 may be provided to hold the screws 122 in adjusted position.

As pointed out in the discussion of the pulley 4, the centrifugal force acting in the pulley must overcome the effective weight of the motor 2, base 30, etc., acting to tension the belt 5 to effect an increase in the effective pulley diameter. Thus, as the centrifugal force changes by definite small increments due to changes in the speed of the pulley 4, the effective pulley diameter also changes by certain small increments. By altering this effective weight, as by adjusting the springs 119, 120, the amount of centrifugal force necessary to effect a change is altered, and hence the same change in centrifugal force will cause a different change in pulley diameter, and thus alter the rate of such change.

The operation of the mechanism as a whole may now be reviewed. With the mechanism stationary the transmission is in low speed ratio. Upon energization of the motor 2 the pulley 4 is rotated, such rotation being imparted to the main shaft 13 of the driven machine 9, by the belt 5, pulley 6, countershaft 7, pulley 11, belt 10 and the pulley 12. As the speed of the motor and the driven parts increases, the centrifugal mechanism 132, 133 of the pulley structure 4 urges the pulley sections 128, 129 together causing the pulley 4 to assume an increased effective diameter and swinging motor 2 and base 30 upwardly about the pin 28, which causes the shaft 3 to approach the shaft 7 until the arms 47, 48 engage the rollers 79 and 80 of the abutment 49. This checks the upward movement of the motor 2 and thus fixes the speed ratio of the transmission. By manipulating the hand wheel 18, rod 69, etc., the abutment 49 may be moved to cause an increase or decrease in the speed ratio at any time while the transmission is operating. Further, the rate of such change may be varied by adjusting the springs 119 and 120. Upon deenergization of the motor 2, the force urging the pulley section 128—129 together decreases so that the tension in the belt 5 urges the pulley sections apart until separation of the sections is stopped by the hub 147 of the pulley section 129 engaging the hub 148 of the member 139. The motor 2 meanwhile moves downwardly about its pin 28 to maintain the belt 5 under tension. Thus, the transmission always returns automatically to its low speed position when coming to a stop, and is in its most effective position for starting the load when desired. With the transmission stopped, abutment 49 may be adjusted as desired by either quick change means 19 or handwheel 18, to cause the transmission to assume a desired ratio when it is again placed in operation.

Since the belt 5 is the sole means limiting downward or counterclockwise movement of the motor 2 and the motor base 30 about the pin 28, it is desirable to provide means to appropriately support the motor 2 and the base 30 in case the belt 5 breaks. For this purpose a safety stop 50 is provided. This stop 50 may be formed conveniently by a member 115 threaded into the top wall 51 of the housing 57 immediately below one of the arms as 34 of the base 30 and secured in adjusted position by a lock nut 116. As clearly shown in Figure 2, the stop 50 is so positioned as to provide a small clearance below the arm 34 when the transmission is in its low speed adjustment and thus is without effect on the normal operation of the transmission. However, if the belt 5 breaks the motor base 30 and the motor 2 will drop below such low speed position and be supported adequately by the arm 34 engaging the stop 50.

I claim:

1. In a variable ratio transmission including a pair of spaced parallel shafts, pulley structures respectively on said shafts operatively connected by a belt, at least one of said pulley structures having a variable effective diameter, said diameter being a function of the center distance between said shafts: means forming a pivotal support, bracket members respectively rotatably mounting said shafts spaced radially from said support, and supported on said pivotal support for independent angular movement thereabout, and means fixing said members in adjusted positions about said pivot whereby to adjust the center distance between the shafts and determine the ratio of the transmission.

2. A frame for supporting a variable ratio transmission of the type wherein the center distance between a pair of spaced parallel shafts operatively connected by a belt is adjusted to alter the speed ratio of the transmission: comprising means forming a pivotal support, brackets respectively rotatably supporting said shafts and mounted on said pivotal support, said brackets extending in opposite directions from said support and being upwardly directed therefrom, and means adjustably positioning said brackets about said support for adjusting the distance between said shafts.

3. A frame for supporting a variable ratio transmission of the type wherein the center distance between a pair of spaced parallel shafts operatively connected by a belt is adjusted to alter the speed ratio of the transmission: comprising means forming a pivotal support, brackets respectively rotatably supporting said shafts and mounted on said pivotal support, said brackets extending in opposite directions from said support and being upwardly directed therefrom, means fixing the position of one of said brackets about said support, and means adjustably limiting the downward movement of the other bracket about said support but permitting free upward movement thereof in response to increased belt tension for altering the distance between the shafts.

4. A frame for mounting a variable ratio transmission of the type including a pair of adjustably spaced parallel shafts, a pulley structure on each of said shafts, and an edge active belt operatively connecting said pulley structures, at least one of said pulley structures having a variable effective diameter, the ratio of the transmission being a function of the center distance of the shafts: comprising means forming a fixed pin, a pair of bracket members mounted on said pin for free angular movement thereon, means rotatably supporting said shafts on said members respectively, and means for fixing said members in adjusted positions on the pin whereby to adjust the center distance of the shafts and alter the transmission ratio.

5. In mounting means for a variable ratio transmission including a driving shaft and a load driving shaft, pulley structures respectively on said shafts operatively connected by a belt, at least one of said pulley structures having a variable effective diameter which is a function of said center distance, said load driving shaft being arranged to operate a driven shaft by a second belt: means forming a pivotal support, means rotatably mounting said load driving shaft for movement about said support to alter the position of said load driving shaft with respect to the driven shaft to adjust the tension in said second belt, and means rotatably mounting said driving shaft for movement about said support to alter said center distance and determine the transmission ratio.

6. In a variable ratio transmission for operating a driven shaft, a pair of spaced shafts arranged to be operatively connected by a belt, means whereby a variation in the spacing of said shafts alters the transmission ratio, one of said shafts being adapted to be connected with said driven shaft by a second belt, a pivotal support, and independent means rotatably mounting said pair of shafts respectively on said pivotal support, and spaced radially therefrom, for independent movement about said support, whereby said one shaft may be adjusted with respect to the driven shaft to alter the tension in said second belt, and the spacing of the transmission shafts may be adjusted to alter the ratio of the transmission.

7. In support means for a variable ratio transmission of the type including a pair of spaced parallel shafts with a pair of belt connected pulleys respectively mounted on the shafts and in which the transmission ratio is a function of the center distance of the shafts, the load driving shaft of the transmission being adapted to be operatively connected with the load by a belt: a fixed pin intermediate said spaced shafts and parallel therewith, a pair of bracket members mounted on said pin for free angular movement thereon and extending in generally opposite directions from the pin, means rotatably mounting the spaced shafts on the bracket members respectively, and means for independently adjusting the angular positions of said bracket members on the pin whereby to adjust the tension in the belt driving the load and alter the ratio of the transmission.

8. Mechanism for angularly positioning a bracket member about pivot forming means on which said bracket is rotatably supported, comprising a threaded rod extending transversely of said pivot forming means, a nut forming member adapted to threadedly engage said rod for movement axially of the rod in response to rotation thereof, means whereby the position of said member on the rod acts to determine the position of the bracket about the pivot means, an elongated member extending through said nut member and supported for movement in a direction parallel with the rod, means whereby limited axial movement of said elongated member disengages the nut forming member from the rod, and means whereby continued movement of said elongated member is effective to move the nut forming member to a desired adjusted position along the rod.

9. In adjusting mechanism for altering the position of a member axially of a rod, means whereby said member threadedly engages said rod for fine adjustment in response to rotation of the rod, comprising a mutilated nut pivotally carried by said member and movable about its pivot to engage or disengage the rod, and quick adjusting means, comprising means movable in a direction parallel with the rod, means forming cooperating cam surfaces respectively on the movable means and the nut, whereby movement of said movable means in either direction serves to swing the nut about its pivot out of engagement with the rod, and stop means on the movable means for engaging the nut and moving the member axially of the rod upon continued movement of the movable means.

10. In adjusting mechanism for altering the position of a member axially of a rod, means whereby said member threadedly engages said rod for fine adjustment in response to rotation of the rod, comprising a split nut having a pair of sections, means pivotally mounting said sections on said member for movement into and out of engagement with said rod, means urging said sections into engagement with the rod, and quick adjusting means comprising means movable parallel with said rod, means forming cam surfaces respectively on said nut sections and said movable means for swinging said nut sections apart and out of engagement with the rod upon movement of the movable means, and a stop on said movable means for engaging said nut and moving the member upon continued movement of the movable means after disengaging the nut sections.

11. In a variable ratio transmission, a driving shaft and a load driving shaft, pulley structures respectively on said shafts operatively connected by a belt, the pulley structure on said driving shaft comprising a pair of relatively axially movable pulley sections with opposed oppositely inclined belt engaging faces, forming by relative axial adjustment different effective pulley diameters, means whereby said pulley sections are urged together to increase the effective pulley diameter, means supporting said shafts for movement with respect to each other to vary the center distance in response to a change in said pulley diameter, means constantly urging said shafts apart to maintain said belt tensioned, means exerting a resilient force in assisting relation to the means urging the pulley sections together, and means for adjusting said force to control the rate of change in the diameter of the adjustable pulley, comprising a rotatable member and a stationary mounting therefor, whereby said member is optionally operable to adjust said force while the transmission is in operation.

12. In a variable ratio transmission including a pair of spaced shafts and pulley structures respectively on said shafts operatively connected by a belt, one of said pulley structures having a variable effective diameter: means to control the ratio of said transmission, comprising a rotatable rod, a movable member threadedly engaging said rod, means supported by said member for movement with respect thereto operating to disengage said member from said rod upon movement relative to said member and an element engageable by said means upon said member reaching a position corresponding to a predetermined transmission ratio, causing disengaging operation of said means, said means being optionally operable thereafter to cause reengagement of said member and said rod.

13. In a variable ratio transmission including a pair of spaced shafts and pulley structures respectively on said shafts operatively connected by a belt, one of said pulley structures having a variable effective diameter: means to control the ratio of said transmission, comprising a rotatable rod, a movable member threadedly engaging said rod, means supported by said member for movement with respect thereto, operating to disengage said member from said rod upon movement relative to said member, and an element engageable by said means whenever said member reaches a position corresponding to the maximum or minimum transmission ratio, causing disengaging operation of said means, said means being optionally operable thereafter to cause reengagement of said member and said rod.

14. In a variable ratio transmission including a pair of spaced shafts and pulley structures respectively on said shafts operatively connected by a belt, one of said pulley structures having a variable effective diameter: means to control the ratio of said transmission, comprising a rotatable rod, a movable member threadedly engaging said rod, and having a cam surface formed thereon, actuating means, having a cooperating cam surface, carried by said member and movable with respect thereto, means restraining movement of said actuating means with respect to said member, relative movement between said member and said actuating means causing said cam surfaces to operate to disengage said member from said rod, and means engageable by said actuating means upon a predetermined movement of said member to cause relative movement between said member and the actuating means and disengage the member from the rod.

15. In control mechanism adapted to adjust the radio of a variable ratio transmission including a pair of spaced shafts and pulleys respectively on said shafts operatively connected by a belt, one of said pulleys having a variable effective diameter: a rotatable rod, a member movable in response to rotation of said rod to alter the transmission ratio, and means including a cam surface engageable by said member in response to movement thereof for rendering rotation of said rod ineffective to move said member when said transmission has been adjusted to a predetermined ratio.

16. In adjusting mechanism including a rotatable rod, bearing means for radially and axially supporting one end of said rod, bearing means for radially supporting the other end of the rod, and means for securing said bearing means in aligned positions, comprising: means for adjusting one of said bearing means to alter the direction of the axis of the bearing in the plane of said axis and means for adjusting the other bearing means to alter the direction of the axis of said last mentioned bearing means as well as to adjust the axis laterally with respect to the first mentioned axis.

DON HEYER.

REFERENCES CITED

The following references are of record in the file of this patent:

UNITED STATES PATENTS

| Number | Name | Date |
|---|---|---|
| 489,292 | Duffy | Jan. 3, 1893 |
| 899,741 | Lane | Sept. 29, 1908 |
| 1,058,114 | Symons | Apr. 8, 1913 |
| 1,135,868 | Vinyard | Apr. 13, 1915 |
| 1,249,299 | Barker | Dec. 11, 1917 |
| 1,613,031 | Gifford | Jan. 4, 1927 |
| 1,813,352 | Habelin | July 7, 1931 |
| 1,960,506 | Pfleger | May 29, 1934 |
| 2,070,756 | Skelly | Feb. 16, 1937 |
| 2,171,032 | Guze | Aug. 29, 1939 |
| 2,176,572 | Hedgpeth | Oct. 17, 1939 |
| 2,235,122 | Shaw | Mar. 18, 1941 |
| 2,235,972 | Zimmerman | Mar. 25, 1941 |
| 2,278,216 | Rich | Mar. 31, 1942 |
| 2,282,699 | Black | May 12, 1942 |
| 2,299,036 | Rivers | Oct. 13, 1942 |
| 2,321,442 | Wilson | June 8, 1943 |

FOREIGN PATENTS

| Number | Country | Date |
|---|---|---|
| 435,257 | Great Britain | Sept. 18, 1935 |